3,041,352
SUBSTITUTED POLYAMINES
Herbert A. Newey, Lafayette, Calif., assignor to Shell Oil Company, a corporation of Delaware
No Drawing. Filed Dec. 22, 1958, Ser. No. 781,874
4 Claims. (Cl. 260—332.1)

This invention relates to a new class of substituted polyamines. More particularly, this invention relates to new polyamines wherein a 3-sulfolanyl group is substituted upon at least one of the amino nitrogen atoms.

The new compounds of the present invention are characterized by the typical structure consisting of a sulfolanyl structural moiety bonded from the carbon atom in the 3-position of the ring thereof directly to an amino nitrogen atom of a polyamine compound—that is to say, in these new compounds a 3-sulfolanyl structure is bonded directly to an amino nitrogen atom which in turn is bonded via carbon to a structural moiety containing at least one other amino nitrogen atom.

The essential structure of my new polyepoxide curing agents is described generically by the formula:

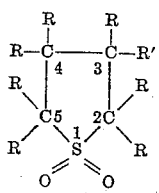

(I)

wherein R' is the polyamino residue of a polyamine, R'H, bonded directly by an amino nitrogen atom thereof to the carbon atom in the 3-position of the sulfolanyl ring.

As shown in Formula I, the sulfolanyl moiety of the compounds of the invention consists of a five-membered heterocyclic ring composed of four carbon atoms and a sulfur atom. The sulfur atom is bonded to two oxygen atoms not part of the hetero ring to form a sulfonyl group. The sulfolanyl ring is bonded from the carbon atom in the 3-position thereof directly to an amino nitrogen atom of a polyamino structural moiety. Numbering of the sulfolanyl ring is in accord with the accepted system as exemplified by the compounds of this type of ring structure given on page 44 of Patterson and Capell, "The Ring Index," Reinhold, 1940—American Chemical Society Monograph No. 84—and as used in U.S. Patent No. 2,461,341.

Suitably, the sulfolanyl moiety may be unsubstituted, or it may be substituted—that is to say, each of the valence bonds of the ring carbon atoms which is not satisfied by another atom of the ring may be satisfied by hydrogen (R in Formula I is hydrogen) or by another atom or structural grouping (R is a substituent other than hydrogen). However, it is preferred that the sulfolanyl ring be substituted only by hydrocarbon; that is to say, it is preferred that each group, R (and each group R may be the same, or different) be either hydrogen or hydrocarbon. It is preferred that any particular hydrocarbon substituent group contain not more than about 10 carbon atoms, and to avoid excessive molecular weight in the compounds of this invention, it is preferred that the total number of carbon atoms in a hydrocarbon substituent group, or in all hydrocarbon substituent groups, if more than one is present, not exceed about 20. Suitable hydrocarbon substituent groups thus include alkyl groups, both straight chain and branched chain in configuration, including as examples the methyl, ethyl, n- and isopropyl groups, the n-, sec- iso-, and tertiary butyl groups, and the various straight-chain and branched-chain $C_5$ to $C_{10}$ alkyl groups. Also included are the aryl groups, including substituted aryl groups, the preferred aryl groups being monocyclic hydrocarbon, for example, benzene and the alkyl-substituted benzenes, such as toluene, the xylenes, ethylbenzene, and the like. Aralkyl groups, such as the benzyl group, the phenethyl group, the p-methylbenzyl group and the like, also are suitable, as are the cycloalkyl groups, such as the cyclohexyl group, the 4-methylcyclohexyl group, the cyclooctyl group, and the like. Preferably, the hydrocarbon substituent group is free from acetylenic unsaturation; however, olefinically unsaturated hydrocarbon substituents are suitable, so that substituent groups such as the allyl group, the crotyl group, the styryl group, the cyclohexenyl group, and the like, all are suitable. Preferably, because of the desirable properties of the sulfolanylpolyamines resulting therefrom, the substituent group or groups, if any, on the sulfolanyl ring are alkyl.

In the compounds of the invention the 3-sulfolanyl moiety is bonded directly to an amino nitrogen atom of the polyamino moiety, R', of the polyamine, R'H, with the proviso that the amino nitrogen atom so directly bonded to the sulfolanyl moiety is bonded by carbon to the remainder of the polyamino moiety. Defined in somewhat more detail, the contemplated polyamino moieties have the formula:

where the indicated free valence bond is satisfied by the 3-sulfolanyl moiety, the symbol $R^1$ represents the amino group bonded to the indicated nitrogen atom via carbon, the symbol $R^2$ has the meaning set out hereinafter. To avoid excessive molecular weight in the compounds of this invention, it is preferred that the polyamino moiety contain not more than about 20 carbon atoms; preferably the polyamino moiety contains not more than about 12 carbon atoms.

In the new compounds, the nitrogen atom bonded to the sulfolanyl ring suitably may be a secondary nitrogen atom ($R^2$=hydrogen) or a tertiary nitrogen atom ($R^2$=organic). The polyamino moiety, $R^1$, may be substantially only aliphatic in character; it may be substantially only aromatic in character; it may be substantially only cycloaliphatic in character; it may be substantially only heterocyclic in character, or it may be of mixed character. Where heterocyclic structures are involved, the indicated nitrogen atom may be involved in the hetero ring (i.e., $R^1$ and $R^2$ together may form a hetero ring with the indicated nitrogen atom, with the proviso that the atoms of the group bonded directly to the nitrogen atom are both carbon atoms, or the indicated nitrogen atom may be bonded to a carbon atom of the hetero ring without itself being a part of that ring. While the polyamino moiety may involve olefinic and/or aromatic unsaturation, preferably the polyamino moiety is free from acetylenic unsaturation. Also, while the polyamino moiety suitably may be composed of elements other than carbon, hydrogen and nitrogen, it is desirable that the only other element present be oxygen. Further, when present, the oxygen should not be involved in any oxo linkage (i.e., O=, as in carbonyl structures found in carboxyl, aldehyde and keto groups) or bonded to a carbon atom involved in any oxo linkage (as in a carboxyl or ester group), but should be involved only in non-acidic oxy (—O—) linkage as in ether groups and in alcoholic hydroxyl groups (oxygen links hydrogen to carbon). Polyamino moieties composed only of the elements: carbon, hydrogen and nitrogen are preferred.

As has been pointed out hereinbefore, the nitrogen atom bonded directly to the sulfolanyl group may be secondary, or it may be tertiary ($R^2$ is organic). Where tertiary, that nitrogen atom may be bonded to two different groups other than the sulfolanyl moiety (i.e., $R^1$ and $R^2$ are different groups), or it may be bonded to different valence bonds of the same, divalent, group to form a heterocyclic ring (i.e., $R^1$ and $R^2$ together form a single group). Further, where the indicated nitrogen atom is part of a heterocyclic ring, the atoms of the ring other than that nitrogen atom may be all carbon, or they may be nitrogen, or oxygen, atoms, with the proviso that the indicated nitrogen atom is bonded only to carbon—that is, if oxygen and/or another nitrogen atom or atoms is involved in the ring, these atoms are bonded via carbon to the indicated nitrogen atom which also is bonded to the sulfolanyl moiety. Still further, where the nitrogen atom bonded directly to the sulfolanyl moiety is tertiary, the group $R^2$ may contain nitrogen, or it may be hydrocarbon, and the group $R^2$ may be the same as the group $R^1$ or it may be different.

The polyamino moiety may suitably contain only nitrogen, carbon and hydrogen—that is, the polyamine may consist only of amino groups linked together by hydrocarbon groups, and/or may consist of one or more amino groups involved in hetero rings composed only of carbon and nitrogen. The polyamino moiety may suitably contain more than one primary amino nitrogen atom, as in the aminoalkylamino groups (equivalently, aminoalkyleneamino groups), such as the 2-aminoethylamino, and the 3-aminobutylamino groups and the like, and as in the p-aminophenylamino group. There may suitably be at least one secondary amino nitrogen atom present, as in an alkylaminoalkylamino group, such as the 2-methylaminoethylamino and the 3-methylaminobutylamino groups, and in the p-methylaminophenylamino group. The 3-sulfolanyl moiety suitably may be bonded to either the primary or the secondary amino atom, or the 3-sulfolanyl moiety may be bonded to a secondary amino atom of a polyamine containing more than one secondary amino nitrogen atom, such as N-ethyl, N-(2-ethylaminoethyl)amine or N-methyl, N-(p-methylaminophenyl)amine. Suitably there may be a tertiary amino nitrogen atom present, as in the 2-dimethylaminoethylamino, the 3-di-n-propylaminopentylamino, and like groups, and in the p-dimethylaminophenylamino group— the sulfolanyl moiety bonded to the primary or secondary amino nitrogen atom. Heterocyclic amino groups are also suitable, including such heterocyclic amino groups, as the imidazolidino group, the trimethylenetriamino group, and the like.

The polyamino moiety suitably may also contain oxy oxygen, as in the aminoalkyloxyalkylamino, and the amino(hydroxy)-alkylamino groups, such as the aminoethyloxyethylamino, the 3-amino-2-hydroxypropylamino, the 4-amino-3-hydroxybutylamino and N-(2-hydroxypropyl)diethylenetriamino groups, and the like.

The compounds of this invention which are of optimum value as polyepoxide curing agents are those wherein the polyamino moiety is basically aliphatic in character and is composed of only the elements: carbon, hydrogen and nitrogen. The chief polyamines of this class are the alkylenediamines (e.g., ethylene, propylene and butylene diamines and the like) and the polyalkylene polyamines. Of most importance, however, are these new compounds wherein the polyamino moiety is a polyalkylenepolyamino group, having the formula $$-NH(R''NH)_nH,$$

wherein $R''$ is an alkylene radical, or a hydrocarbon radical-substituted alkylene radical, and $n$ is an integer greater than one. Those of the new compounds wherein $n$ is an integer between 2 and 6 are especially valuable, and of this subclass of the new compounds, those wherein the polyamino moiety is a polyethylenepolyamino group are particularly preferred. These polyamino moieties have the formula:

$$-NH(CH_2CH_2NH)_nH,$$

wherein $n$ is an integer of between 2 and 6.

The simplest way, commensurate with accuracy, for naming the compounds of this invention appears to simply designate them in terms of the amine from which they may be considered to have been derived by substitution of the 3-sulfolanyl group for a hydrogen atom attached to the amino atom of the amine. Thus, the compound having the formula

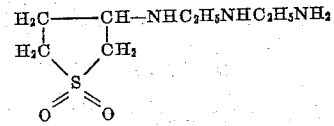

strictly is designated as N-(3-sulfolanyl), N-[2-(2-aminoethylamino)-ethyl]amine. The compound however may also be considered to be the product of substitution of a 3-sulfolanyl group for a hydrogen atom attached to a terminal amino nitrogen atom of N-[2-(2-aminoethylamino)ethyl]amine, commonly known as diethylenetriamine. To avoid the complicated strict nomenclature, yet to be accurate, herein the compound will be designated as N-(3-sulfolanyl)diethylenetriamine, and other substituted polyamines of this invention will be designated in a like manner.

Typical species of my new class of N-(3-sulfolanyl)-polyamines include, for example:

N-(3-sulfolanyl)ethylenediamine,
N-(3-sulfolanyl)diethylenetriamine,
N-(3-sulfolanyl)triethylenetetramine,
N-(3-sulfolanyl)tetraethylenepentamine,
N-(3-sulfolanyl)-(di-(methylethylene)triamine),
N-(2-methylsulfolan-3-yl)diethylenetriamine,
N-(3-methylsulfolan-3-yl)dipropylenetriamine,
N-(2,5-dimethylsulfolan-3-yl)tetrabutylenepentamine,
N-(2,4-diethylsulfolan-3-yl)ethylenediamine,
N-(2-methyl-4-propylsulfolan-3-yl)-phenylenediamine,
N-(2,5-dipropylsulfolan-3-yl)hexamethylenediamine,
N-(2,5-dipropylsulfolan-3-yl)hexamethylenediamine,
N-(2-ethyl-5-phenylsulfolan-3-yl)propylenediamine,
N-(3-sulfolanyl)methylenedianiline,
N-methyl,
N-(3-sulfolanyl)phenylenediamine,
N-ethyl,
N-(2,5-dimethylsulfolan-3-yl)propylenediamine,
N-phenyl,
N-(3-sulfolanyl)ethylenediamine,
N-allyl,
N-(3-sulfolanyl)tetramethylenediamine,
N-(5-allylsulfolan-3-yl)diethylenetriamine,
N-(3-sulfolanyl)benzidine,
N-cyclohexyl,
N-(3-sulfolanyl)diethylenetriamine, and the like.

The N-(3-sulfolanyl)polyamines of this invention are conveniently prepared by adding the amine to the olefinic double bond of a sulfolene. The reaction which occurs may be represented by the following equation for the preparation of N-(3-sulfolanyl)diethylenetriamine from 3-sulfolene and diethylenetriamine:

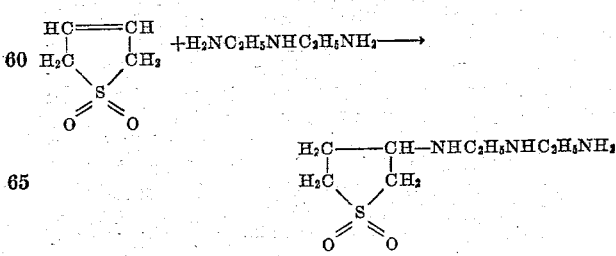

In the case of 3-sulfolene and the lower molecular weight polyalkylenepolyamines, the reaction is effected by merely heating to a moderate temperature (e.g., about 70–90° C.) a mixture of 3-sulfolene, an excess of the polyamine and a substantial amount of water.

However, the reaction (and particularly where a substituted sulfolene is used and/or a higher molecular weight polyalkylenepolyamine or a different polyamine is used) is promoted by the presence in the reaction mixture of a small amount of an alkali substance such as potassium hydroxide or other basic compound of an alkali metal. The presence of the alkali compound establishes a reaction mixture which is sufficiently alkaline to be favorable to the formation of high yields of the desired N-(3-sulfolanyl)polyamines at rapid rates.

The sulfolene reactant is determined by the particular N-(3-sulfolanyl)polyamine desired. The sulfolene may be unsubstituted, or it may be substituted with alkyl or other substituent groups as set out hereinbefore in the description of the suitable 3-sulfolanyl moieties of the compounds of this invention. It is immaterial in most cases whether an alpha-sulfolene (2-sulfolene), i.e., a sulfolene wherein the double bond is between the No. 2 and the No. 3 carbon atoms, or between the No. 4 and No. 5 carbon atoms of the sulfolene nucleus, or a beta-sulfolene (3-sulfolene), i.e., a sulfolene wherein the double bond is between the No. 3 and the No. 4 carbon atoms, is employed. A 4-sufolanyl polyamine is produced from either alpha-sulfolene or beta-sulfolene by the reaction between these compounds and the polyemine. It is probable that under the conditions of the reaction but one of these isomeric sulfolenes is stable and that the other rearranged in the alkaline reaction mixture to form the stable isomer which then reacts with the polyamine.

The following sulfolenes, which may be of either the alpha-sulfolene or the beta-sulfolene type, may be condensed with polyamines to form certain of the compounds of this invention: 2-sulfolene, 3-sulfolene, 2-methylsulfolene, 2,5-dimethylsulfolene, 2,4-dimethylsulfolene, 3,4-diethylsulfolene, 4-ethylsulfolene, 3-propylsulfolene, 5-methylsulfolene, 2-ethylsulfolene, 2-methyl-3-ethylsulfolene, 2-methyl-3-n-butylsulfolene, and the like.

The polyamine reactant is also determined by the particular N-(3-sulfolanyl)polyamine desired. The suitable amines are those which have been set out hereinbefore in the description of the suitable polyamine moieties of the compounds of this invention. As has been set out hereinbefore, the novel N-(3-sulfolanyl)polyamines prepared from aliphatic polyamines are of particular interest. Examples of such aliphatic polyamines include, among others, diethylene triamine, ethylene diamine, propylene diamine, triethylene tetramine, hexylene diamine, tetraethylene pentamine, tri-(ethylethylene) tetramine, tetrabutylene pentamine, and the like.

Mixtures of polyamines also are suitable, the preferred mixtures being the mixture of polyalkylenepolyamines obtained as still residues remaining from the production of alkylene amines and alkylolamines.

One such still residue is the polyamine mixture which is a still residue (bottoms) remaining from the production of ethylene amines. In the manufacture of ethylene amines, ethylene dichloride is reacted with ammonia. The reaction conditions vary, but in all cases a mixture of the members of the series is obtained. At comparatively low temperatures and pressures predominantly ethylene diamine is formed together with some polyethylene polyamines. At higher temperatures and pressures the proportion of the polyethylene polyamines is higher. In the recovery of the higher molecular weight polyethylene polyamines by distillation there remains a still residue which constitutes the suitable polyamine mixture and consists of homologs higher than tetraethylenepentamine. Similar still residues from the production of other polyalkylene polyamine such as polypropylene polyamines also are suitable.

The mixtures of N(3-sulfolanyl)polyamines prepared from such still residues may be of particular interest for the purposes of this invention.

As stated, an alkaline substance is usually employed to establish an alkaline reaction mixture. Suitable alkaline substances comprise in general the more basic compounds of the alkali metals as well as certain of the strong organic bases. Suitable basic compounds include trimethylbenzyl ammonium hydroxide, sodium hydroxide, sodium carbonate, potassium hydroxide, potassium carbonate, lithium hydroxide, caesium hydroxide, rubidium hydroxide and the like. Preferred members of this group are potassium hydroxide, sodium hydroxide and sodium carbonate because of their effective action and their ready availability. These compounds may be used in any effective amount. In most cases an amount of between about 0.1% and about 3.0%, preferably about 1.0%, based on the weight of sulfolene used is an effective and satisfactory amount. They may preferably be used in the form of their aqueous solutions, e.g., solutions containing from about 0.1% to about 40% by weight of basic alkali metal compound.

The ratio of polyamine to sulfolene is variable, depending upon the type of the reactants and the conditions of the reaction. However, it is usually important that a relatively large excess on a mole basis of polyamine be used in order to effect high conversions of sulfolene to an N-(3-sulfolanyl)polyamine. Suitable ratios of polyamine to sulfolene will lie within the range of between about one molecular equivalent of polyamine to one molecular equivalent of sulfolene and about 20 moles of amine per mole of sulfolene. A preferred ratio is about 1 molecular equivalent of sulfolene to about 5 molecular equivalents of polyamine.

The temperature of the reaction is likewise variable depending upon the nature of the reactants and the other operating conditions. In general the upper temperature limit is the decomposition temperature of the sulfolene. In the case of beta-sulfolene, this temperature is about 120° C. The lower temperature limit is that temperature which is necessary to initiate the desired reaction. This temperature is usually about normal room temperature, or about 20° C. to 25° C. It is usually preferred to operate at some intermediate temperature range, i.e., a temperature range of between about 40° C. and about 90° C. A temperature of about 60–80° C. is a particularly desirable and effective operating temperature.

Although the reaction between the polyamine and the sulfolene will take place at atmospheric pressures, it may be desirable to operate at superatmospheric pressures, i.e., pressures of between about atmospheric pressure and about 500 p.s.i. Operating pressures of more than about 100 p.s.i. will seldom be required. The pressure may be maintained constant throughout the reaction, or increased or decreased as desired as the reaction progresses.

It is essential that there be present in the reaction mixture a substantial amount of water. Thus, there should be present at least 5% of water, based on the weight of sulfolene plus polyamine charged, and preferably there is present from about 8% to about 10% of water on the same basis. The presence of more than about 25% of water, based on the weight of polyamine plus sulfolene, will seldom be of additional advantage over somewhat lesser amounts of water. A part or all of the required water may be provided with the basic substance used as promoter.

The N-(3-sulfolanyl)polyamine product is recovered from the final reaction mixture by known means—distillation being a convenient and effective means in most cases.

The preparation of typical N-(3-sulfolanyl)polyamines of this invention by the aforesaid process is illustrated by the following examples:

EXAMPLE I.—N-(3-SULFOLANYL)ETHYLENE-DIAMINE 960 grams (16 moles) of ethylenediamine and 160 milliliters of water were mixed at 75° C. and to the mixture at that temperature 236 grams (2 moles) of 3-sulfolene were added over a period of one hour. The reaction mixture then was stirred for an additional 1.5 hours, the temperature being 80–85° C., and the mixture then was allowed to remain at room temperature for about 48 hours, and then the mixture was distilled at 100° C. and 2 millimeters mercury pressure to remove excess ethylenediamine and water. 352 grams of N-(3-sulfolanyl)ethylenediamine, representing a 99% yield based on 3-sulfolene, were obtained.

*Analysis*

|  | Found | Calculated |
| --- | --- | --- |
| Carbon | 40.0 | 40.4 |
| Hydrogen | 7.9 | 7.9 |
| Nitrogen | 15.6 | 15.7 |
| Sulfur | 18.1 | 18.0 |

EXAMPLE II.—N-(3-SULFOLANYL)DIETHYLENE-TRIAMINE 3090 grams (30 moles) of diethylenetriamine and 300 milliliters of water were mixed at 75° C. To the stirred mixture, 442 grams (3.75 moles) of 3-sulfolene were added over a period of 1 hour. The mixture was stirred for an additional 1 hour at 80–90° C. The mixture was allowed to stand at room temperature for about 12 hours. Distillation of the resulting reaction mixture at 110° C. and 2 millimeters mercury pressure gave 1652 grams of N-(3-sulfolanyl)diethylenetriamine, representing a yield of 100% based on the 3-sulfolene.

*Analysis*

|  | Found | Calculated |
| --- | --- | --- |
| Carbon | 44.6 | 43.5 |
| Hydrogen | 9.0 | 8.5 |
| Nitrogen | 18.8 | 19.0 |
| Sulfur | 14.2 | 14.5 |

To ascertain their toxicity toward mammals, a sample of N-(3-sulfolanyl)diethylenetriamine and a sample of a mixture of polyamines (primarily diethylenetriamine) commercially used as a polyepoxide curing agent, were tested under like conditions to determine their respective effect upon the bare skin of a rabbit. The effect of the test materials was determined by visual inspection. The result of the test was in each case reported on a scale of from 0 (=no visible skin irritation) to 8 (=severe skin and flesh damage).

The tests showed that N-(3-sulfolanyl)triethylenediamine had a rating of 0, showing that it had no measurable skin toxicity under the conditions of the test.

Under comparable conditions and on the same rabbit, the commercially used polyamine curing agent had a rating of 8—that is, this commercially used product caused very severe damage to the skin and flesh.

Thus, I have also discovered that the new compounds of this invention are useful as superior curing agents for polyepoxides, since the new compounds have low volatility, and are virtually non-toxic. The polyepoxide products cured with one or more of these new compounds have superior hardness and solvent resistance.

The polyepoxides may be cured with the hereinbefore described N-(3-sulfolanyl)polyamines by merely mixing the two components together. The reaction occurs slowly at temperatures as low as about 20° C. and for best results it is best to heat the mixture between about 40° C. and about 200° C. Particularly preferred temperatures range from about 40° C. to about 150° C.

The amount of curing agent employed in the cure of the polyepoxides may vary over a considerable range. Amounts of N-(3-sulfolanyl)polyamine curing agent can range from about 5 parts per 100 parts of polyepoxide up to 40 parts per 100 parts of polyepoxide. Best results are obtained, however, when the curing agent is employed in amounts varying from 10 to 30 parts per 100 parts of polyepoxide.

A single one of the new N-(3-sulfolanyl)polyamines may be used as the curing agent, or there may be used a mixture of two or more different N-(3-sulfolanyl)polyamines. Likewise, the curing agent may be pure N-(3-sulfolanyl)polyamine(s) or the curing agent may be impure N-(3-sulfolanyl)polyamines, such as a partial distillation product, or the like, or the mixture of N-(3-sulfolanyl)polyamines prepared from the still residues from the production of ethylene amines, as described hereinbefore.

In curing the polyepoxide, it is usually desirable to have the polyepoxide in a mobile condition when the N-(3-sulfolanyl)polyamine is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of polyepoxide. These may be volatile solvents which escape from the polyepoxide compositions containing the curing agent by evaporation before or during the curing such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons, such as trichloropropane, chloroform, etc. To save expense, these active solvents may be used in admixture with aromatic hydrocarbons such as benzene, toluene, xylene, etc. and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average equivalent weight of the polyepoxide.

Various other ingredients may be mixed with the polyepoxide subjected to cure with the N-(3-sulfolanyl)polyamines including pigments, fillers, dyes, plasticizers, resins, and the like.

One important application of the use of the new N-(3-sulfolanyl)polyamines as curing agents for polyepoxides is in the preparation of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like. It is useful to prepare the laminates from woven glass cloth that has been given prior treatment with well known finishing or sizing agents therefor, such as chrome methacrylate or vinyl trichlorosilane.

In preparing the laminate, the sheets of fibrous material are first impregnated with the mixture of the polyepoxide and curing agent. This is conveniently accomplished by dissolving the curing agent in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C., preferably to about 20° C. to 25° C. A plurality of the impregnated sheets are then superimposed and the assembly is cured in a heated press under a pressure of about 25 to 500 or more pounds per square inch. The resulting laminate is extremely strong and resistant against the action of organic and corrosive solvents, and is of superior hardness.

The compositions provided by the invention are also useful for protective coatings. In this application they are preferably dissolved in an organic solvent and this mixture applied to the desired surface. Various solvents are suitable for this purpose such as lower saturated ketones like acetone, methyl ethyl ketone, methyl isobutyl ketone, methyl hexyl ketone, cyclohexanone, methyl cyclohexanone, etc.; esters like ethyl acetate, isopropyl acetate, butyl acetate, isoamyl acetate, etc.; and monoalkyl ethers of ethylene glycol like methyl, ethyl or butyl ethers, such solvents preferably having a boiling point below 175° C. If desired, other materials like lower aromatic hydrocarbons such as benzene, toluene and/or xylene may be used in combination with the oxygen-containing compounds for the purpose of cheapening the cost of the solvent.

The solutions of the compositions provided by the invention are applied for coating surfaces needed to be protected by brushing, spraying and the like. The amount of solvent contained in the solution may be varied to suit the particular need. Ordinarily, the solution will contain about 5% to 60% of the composition of the invention. The solution is applied to the surface to be coated, and either the solvent is first allowed to evaporate, after which heat is applied by circulating hot air or by use of infrared lamps, or the heating is effected with simultaneous removal of solvent and curing.

When used as film-forming agents, the compositions may have various other materials incorporated therewith besides solvents such as pigments and other resins. Thus pigments like titanium oxide, antimony oxide, carbon black, chrome yellow, zinc oxide, para red, and the like, may be used. Best results in preparing the enamels are obtained by grinding the pigment with a portion of the solvent and epoxy ether, and then adding the remainder of the solvent and epoxy ether after the grinding operation. The enamel is ready for application upon addition of the curing agent.

The polyepoxides to be cured by use of the above process are those organic compounds containing a plurality of epoxy groups, i.e.,

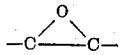

groups. These compounds may be saturated or unsaturated, aliphatic, cycloaliphatic, aromatic or heterocyclic and may be substituted if desired with substitutents, such as halogen atoms, OH groups, ether radicals, and the like.

For clarity, polyepoxides and particularly those of the polymeric type are preferably described in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact, the epoxy equivalency will be integers, such as 2, 3, 4, and the like. However, in the case of polymeric-type polyether polyepoxides many of the materials may contain some of the monomeric monoepoxides or have some of their epoxy groups hydrated or otherwise reacted and/or contain macro-molecules of somewhat different molecular weight so the epoxy equivalency may be quite low and contain fractional values. The polymeric material may, for example, have an epoxy equivalency of 1.5, 1.8, 2.5, and the like.

The epoxy-containing materials referred to above may be exemplified by the epoxidized esters of the polyethylenically unsaturated monocarboxylic acids, such as epoxidized linseed, soyabean, perilla, oiticica, tung, walnut and dehydrated castor oil, methyl linoleate, butyl linolenate, ethyl 9,12-octadecadienoate, butyl 9,12,15-octadecatrienoate, ethyl elaeostearate, octyl 9,12-octadecadienoate, methyl elaeostearate, monoglycerides of tung oil fatty acids, monoglycerides of soyabean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tertarate, di(4,5-epoxytetradecyl) maleate, di(2,3-epoxybutyl) azelate, di(2,3-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 3,4-epoxycyclohexyl 4,5-epoxyoctanoate, and the like.

Still another group of the epoxy-containing materials include epoxidized derivatives of polyethylenically unsaturated polycarboxylic acids, such as, for example, dimethyl 8,9,12,13-diepoxyeicosanedioate, dibutyl 7,8,11,12-diepoxyoctadecanedioate, dioctyl 10,11-diethyl-8,9,12,13-diepoxyeicosanedioate, dihexyl 6,7,10,11-diepoxyhexadecanedioate, didecyl 9-epoxyethyl-10,11-epoxyoctadecenedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters of unsaturated polycarboxylic acid or anhydride groups, such as, for example, the polyester obtained by reacting diethylene glycol with 2-cyclohexene-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Of particular interest are the commercially available glycidyl polyethers of polyhydric phenols and polyhydric alcohols.

Examples of these preferred polyepoxides suitable for use in the present process are given in U.S. 2,633,458 and it is understood that so much of the disclosure of that patent relative to polyepoxides is incorporated by reference into this specification.

To illustrate the manner in which the invention may be carried out, the following examples are given. It is to be understood, however, that the examples are for the purpose of illustration and the invention is not to be regarded as limited to any of the specific materials or conditions recited therein.

The polyethers referred to in the examples such as, for example, Polyether A, are those described in U.S. 2,633,458.

EXAMPLE III

This example illustrates the use of N-(3-sulfolanyl)diethylenetriamine as a curing agent for a typical polyepoxide, namely, a glycidyl polyether of 2,2-bis(4-hydroxyphenyl)propane having a molecular weight of about 350 and an epoxy value of 0.50 equivalent per 100 grams (Polyether A).

This example also illustrates the superiority of N-(3-sulfolanyl)diethylenetriamine over a typical commercially used polyamine as curing agent for the typical polyepoxide, Polyether A.

In these experiments, 100 part portions of Polyether A were cured with equivalent amounts, respectively, of N-(3-sulfolanyl)diethylenetriamine and of a commercially used polyamine curing agent (primarily diethylenetriamine), 28 parts of the N-(3-sulfolanyl)diethylenetriamine being mixed with 100 parts of Polyether A, and 10.7 parts of the commercial mixture of polyamines being mixed with 100 parts of Polyether A. The mixtures then were cured by heating for two hours at 60° C., then for four hours at 150° C. The following table demonstrates the superior curing properties of the N-(3-sulfolanyl)diethylenetriamine as compared to the commercial curing agent.

| Property | N-(3-sulfolanyl)-diethylenetriamine | Commercial Curing Agent |
|---|---|---|
| Flexural strength (p.s.i.) | 24,100 | 17,700 |
| Compressive strength (p.s.i.) | 17,600 | 16,700 |
| Tensile strength (p.s.i.) | 11,700 | 11,000 |
| Izod Impact | 0.62 | 0.59 |
| Solvent absorption after one month, percent by weight: | | |
| Water | 0.88 | 1.1 |
| Acetone | 0.84 | 2.4 |
| Benzene | 0.08 | 0.14 |
| 10% w. NaOH | 0.64 | 0.88 |

It will be noted that the composition cured by N-(3-sulfolanyl)triethylenediamine has superior strength, superior hardness and superior resistance to common solvents as compared to the composition cured by the commercial polyamine curing agent.

In addition to their use as superior polyepoxide curing agents, the novel compounds of this invention are useful for a wide variety of other purposes. Thus, they are stable, non-toxic agents suitable for the removal of hydrogen sulfide, carbon dioxide and other acidic gaseous materials from stack gases, refinery streams, and the like. They also find use as components of compositions used as foam builders, and other applications involving change in the surface properties of liquids. Also, these novel compounds may be employed in the preparation of natural or synthetic rubbers, resins, plastics, etc. other than polyepoxides, and they are of value in the resin and lacquer industry as plasticizers, or in the preparation of amides suitable as plasticizers. The new compounds also are of value per se, or as raw materials or intermediates in the preparation of antioxidants, pour point depressants, ingredients in cosmetics, as base materials and as fixing agents in the preparation of perfumes, and as softening agents for the leather industry. These new N-(3-sulfolanyl)polyamines may be further reacted to produce valuable products suitable for a variety of uses—for example, they may be reacted with carbon disulfide to form compounds of interest as rubber curing agents. Moreover, these new N-(3-sulfolanyl) polyamines have such a structural configuration as to be of substantial value in the preparation of various other materials.

I claim as my invention:
1. N-(3-sulfolanyl)diethylenetriamine.
2. N-(3-sulfolanyl)ethylenediamine.
3. N-(3-sulfolanyl)-polyamine of the formula

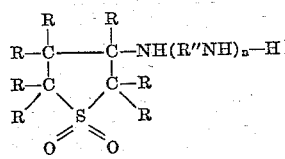

wherein each R is a member selected from the group consisting of hydrogen and alkyl of 1 to 10 carbon atoms, R'' is alkylene of 1 to 20 carbon atoms, with the proviso that the sum of each R, and R'', carbon atoms does not exceed 20, and $n$ is an integer between 1 and 6.

4. N-(3-sulfolanyl)-polyamine of the formula

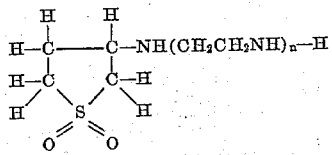

wherein $n$ is an integer between 2 and 6.

References Cited in the file of this patent

UNITED STATES PATENTS

| 2,430,821 | Morris | Nov. 11, 1947 |
| 2,461,341 | Morris | Feb. 8, 1949 |
| 2,610,192 | Mahan | Sept. 9, 1952 |
| 2,640,834 | Tewksbury | June 2, 1953 |
| 2,768,165 | Schuetz | Oct. 23, 1956 |